Patented June 13, 1944

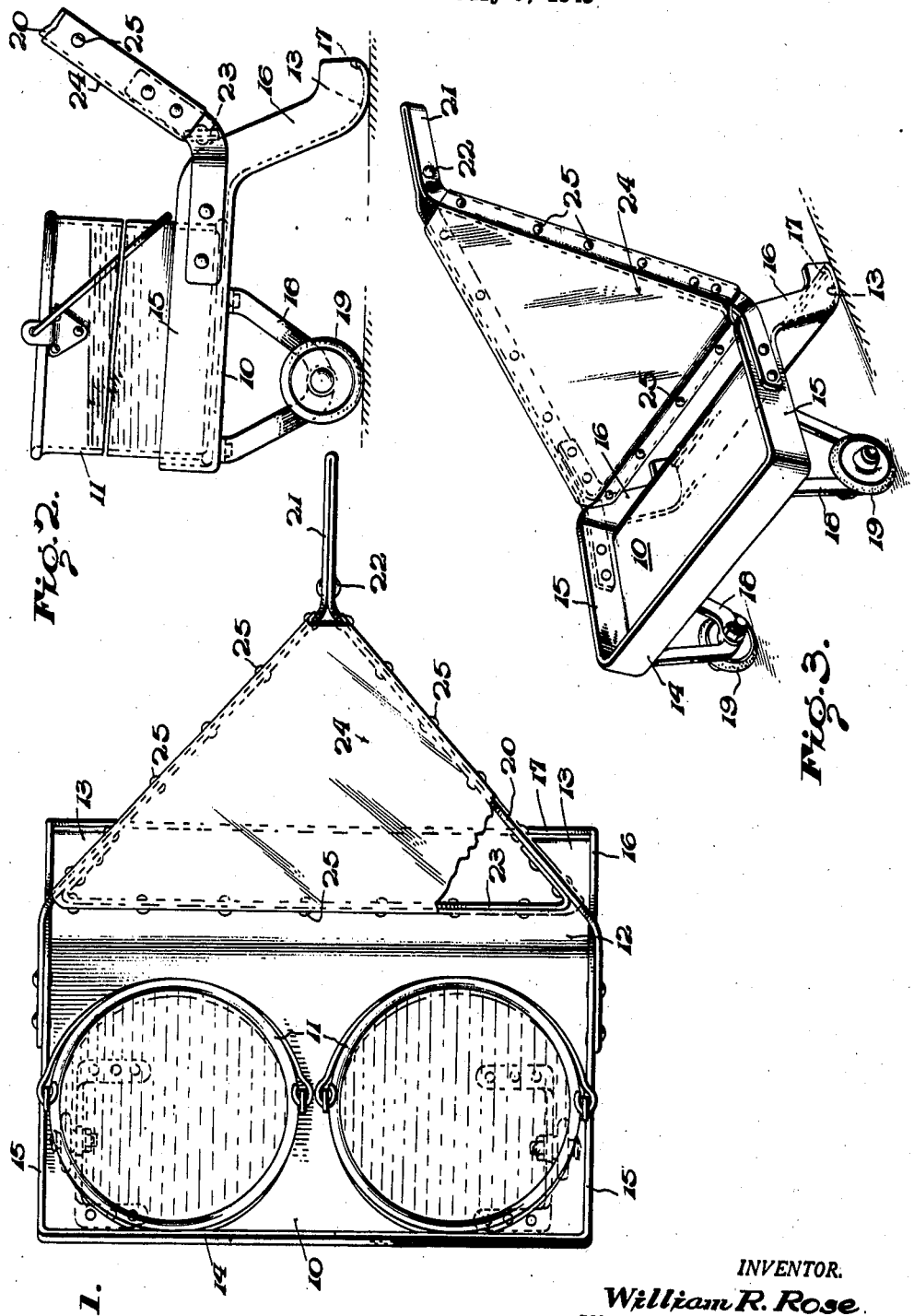

2,351,292

UNITED STATES PATENT OFFICE 2,351,292

HOT TAR ROOF CART

William R. Rose, Arlington, Va.

Application July 9, 1943, Serial No. 494,066

5 Claims. (Cl. 280—60)

This invention relates to a hot tar roof cart.

In applying slag roof coverings, it is customary to lay on a more or less flat roof deck, lapped courses of tar paper and these courses are sealed, each to the next, by a coating of hot tar at the overlap. Further, the entire surface of tar paper is usually coated with hot tar after the courses of tar paper have set. Usually, the tar is heated at the base of the building, then hoisted in buckets to the roof deck, and thence carried by a workman, two buckets at a time, to the point of use. The roof may be cluttered with rolls of tar paper as well as other hazards to the workman carrying the buckets of hot tar and as the tar is so exceedingly sticky it will, should the workman splash or spill some, sear a hole through the clothing and stick to the flesh to blister, before the workman may remove the clot. Such an eventuality not infrequently causes not only the loss of the helper from work but also, oftentimes, legal suits, compensation and damages.

It is therefore an object of the present invention to provide a cart especially designed for use on a slag roof for transporting hot buckets of tar from the hoist to the point of use, so that the workman using the cart will be relieved of the hazard of spilling hot tar upon himself.

A further object of the invention is to provide a cart which, when at rest, will be tilted rearwardly but which, when lifted by its workman by the handle, will be level, so that a maximum volume of hot tar may be carried in the buckets without spilling.

Another and more important object of the invention is to provide a cart wherein a drip apron will provide a long foot for the cart when at rest, affording frictional drag for the cart on the roof so that the cart may not, by gravity, start into motion and run off the roof.

Still another object of the invention is to provide a cart wherein the drip apron will be so fashioned as to direct any hot tar spilled in the cart onto the roof surface, and wherein said apron will be reinforced by side flanges which will afford rigidity to the apron.

A further object of the invention is to provide a cart wherein the body of the cart, the apron, the foot and the side flanges employed may all be formed of a single piece of sheet metal.

Another object of the invention is to provide a cart wherein a brace for the handle of the cart will be so disposed as to provide a stop located to prevent the buckets in the cart from sliding backwardly out of the cart.

And the invention seeks, as a still further object, to provide a cart wherein the side bars of the handle, in conjunction with the stop bar thereon, will provide a mounting for a shield disposed to prevent hot tar splashed rearwardly from striking the workman pushing the cart, and wherein the shield will be disposed to drain any tar thereon onto the drip apron of the cart.

Other and incidental objects of the invention will appear as the description thereof proceeds, and in the drawing:

Figure 1 is a top plan view of my improved roof cart, two conventional tar buckets being shown in position in the cart.

Figure 2 is a fragmentary side elevation of the cart.

Figure 3 is a perspective view showing the cart with the buckets removed.

In carrying the invention into effect, I employ a flat, imperforate body 10 which, in the instance shown, is of a width and length not greatly more than sufficient to accommodate, without crowding, a pair of conventional tar buckets. For convenience, I have depicted two of such buckets at 11.

At the rear side of the body, the bottom wall thereof is bent downwardly and rearwardly along more or less of a sine curve to form an imperforate apron 12 which latter, at its lower extremity, terminates in a foot 13. As will be observed, the foot is bent to present an approximately flat surface to rest upon a roof and is of the same length as the apron.

Upstanding from the bottom wall of the body 10 at its forward side is a flange 14 and upstanding from the bottom wall of the body at its ends are like end flanges 15. As will be perceived, these flanges will not only lend rigidity to the body but will also prevent the buckets 11 from sliding either forwardly or laterally out of the body. At the ends of the body, the flanges 15 are continued to form end flanges 16 for the apron 12. These flanges 16 are important as, in conjunction with the flanges 15, they will tend to prevent bending of the apron along longitudinal lines or flexing of the apron under the weight of the buckets when the cart is at rest. The rear edge of the foot 13 is without any flange and although, due to the curvature of the foot, a slight upwardly turned lip 17 is formed, still, in actual practice, the slight channel behind this lip has been found to soon fill with congealed tar while the lip itself has proven of signal value in preventing abrasion of the roof surface should the cart be allowed, by a workman, to slide to a stop, as very often happens.

It is now to be noted that the body 10, apron 12, foot 13, flanges 14, 15 and 16, and lip 17 are all preferably formed from a single piece of suitable resilient sheet metal. As will be appreciated, this construction lends to ease and rapidity of manufacture as well as reduced cost of production as the whole structure may be stamped.

Bolted or otherwise fixed to the bottom wall of the body 10 near its ends are substantially V-shaped brackets 18 and suitably journaled at the crotches of said brackets are appropriate wheels 19, preferably of such a character as not to mar or seam a roof surface. For this purpose, the treads of said wheels may, if so desired, be considerably wider than the wheel webs.

Suitably secured to the rear end portions of the end flanges 15 of the body 10 are the angular ends of the divergent side bars 20 of a handle 21. The whole is preferably formed from a single strap of metal secured together, as by a rivet or the like 22, at the forward end of the handle. As will be noted, the handle 21 is bent to extend at more or less of a right angle to the length of the side bars 20.

Extending transversely between the wide end portions of the side bars 20 of the handle 21 is a stop bar 23 suitably secured at its ends to said side bars. This stop bar not only serves a pronounced function to prevent lateral flexing of the handle and afford unexpected rigidity thereto but also, a second function of affording a barrier to prevent the buckets 11 from sliding rearwardly out of the body 10. This latter function has been found important also, in the practical use of the cart, as most workmen will drop the handle 21 at destination of the cart, and thus start the buckets 11 sliding rearwardly on the bottom wall of the body 10 lubricated with hot tar.

It should be envisioned in connection with the structure of this cart, that the average workman cannot help spilling at least some of the hot tar over the rims of the buckets. This hot tar runs down the sides of the buckets into the body 10 and so down the apron 12, across the foot 13 and onto the roof surface. It is for this reason, among others, that the bottom wall of the body, apron and foot have been shaped as shown and described, so that the hot, dripping tar may flow by gravity to the roof surface. As previously noted, any little channel formed by the lip 17 becomes soon filled with congealed tar so that the fresh, hot tar flows freely over onto the roof. Without such provisions, it would be necessary to set fire to the residue of tar in the cart and burn it out, which procedure would, of course, warp and ruin the cart for further use.

As brought out in Figure 2 of the drawing, the center of gravity of the cart, as regards the wheels 19, is rearwardly of the buckets 11. Therefore, when the workman drops the handle 21, upon reaching destination, the cart will tilt rearwardly to rest upon the foot 13. This is of advantage in not only preventing an accidental forward upset of the cart but also in determining the fullness of the buckets 11 when the cart is at rest. When the cart is at rest, the level of the tar in the buckets will be highest toward the rear. However, when the cart is in motion or, let us say, picked up by the workman by the handle 21, the tar will be level in the buckets. This feature has been found to accelerate work and the movement of hot tar across a roof to the point of use, as a workman soon learns the inclined level of tar when the cart is at rest at which he may hold the cart level in motion and so transport a maximum of tar in the buckets and save unnecessary trips back to the lift.

It should be noted that the wheels 19 are set back far enough from the ends of the body 10 so that said wheels will be shielded by the body and thus prevented from becoming coated with tar which may splash from the buckets 11. As will be appreciated, congealed tar on the axles of said wheels would greatly impede the functioning of said wheels.

Secured to the sides of the triangle formed by the forwardly and downwardly inclined side bars 20 of the handle 21 and the stop bar 23 is a shield 24 preferably formed of a single piece of suitable resilient sheet metal. This shield is provided with like side and end flanges which overhang said bars and are secured thereto preferably by rivets 25.

The handle, as a whole, is thus by the presence of the shield 24, reinforced in all directions and rendered practically rigid, which has been found important. However, the more important function of the shield is, perhaps, to protect the workman using the cart. Suppose, for instance, that the cart while in motion strikes an obstruction. As will be understood, the hot tar in the buckets 11 will first be impelled forwardly and will then surge rearwardly with the result that the tar will often splash rearwardly out of the buckets. The shield 24 is, as will be perceived, disposed to intercept the splash of hot tar rearwardly out of the buckets and protect the workman using the cart. Furthermore, the shield will, due to its downward and forward inclination, direct the tar splashing thereon onto the apron 12 to be thence directed to the roof surface, as previously explained.

Having thus described my invention, what I claim is:

1. A hot tar roofing cart including a body adapted to receive a container of hot tar and having its bottom wall continued at the rear side of the body to form an apron sloping rearwardly and downwardly from the body for directing by gravity onto a roof hot tar spilled in the body, said apron terminating in a foot to contact the roof and of a length coextensive with the apron to afford distributed frictional drag against the roof for holding the cart stationary when at rest, and wheels supporting the body for movement over the roof.

2. A hot tar roofing cart including a body adapted to receive a container of hot tar and having its bottom wall continued at the rear side of the body to form a sinuously and downwardly curved apron for directing by gravity onto a roof hot tar spilled in the body, said apron terminating at its lower extremity in an arcuate foot to engage the roof for sustaining the rear portion of the cart when said cart is at rest as well as affording an elongated drag surface to contact the roof for normally holding the cart stationary when at rest, and wheels supporting the body for movement over the roof.

3. A hot tar roofing cart including a body having a bottom wall continued to form an apron sloping downwardly from the body for directing onto a roof hot tar spilled in the body, supporting wheels for the body, a handle connected to the body adjacent to said apron, and a shield carried by the handle and disposed to intercept hot tar splashing from a container in the body toward a workman operating the cart by said handle and direct tar splashed thereon onto said apron to thence drain to the roof.

4. A hot tar roofing cart including a body, and supporting wheels for the body, the body being provided with an apron depending from the body for directing onto a roof hot tar draining from the body and terminating in a foot disposed to cooperate with said wheels for supporting the body when the cart is at rest.

5. A hot tar roofing cart including a body provided with ground wheels for supporting the body for movement over a roof and having a bottom wall continued to form an apron sloping downwardly from the body and having symmetrical junction therewith to afford unimpeded flow onto a roof of hot tar spilled in the body, said apron terminating at its lower end in a foot disposed to cooperate with said wheels for supporting the body when the cart is at rest.

WILLIAM R. ROSE.